United States Patent [19]

Nusbaum

[11] Patent Number: 4,728,407

[45] Date of Patent: Mar. 1, 1988

[54] MULTIPLE CHAMBER SILVER EXTRACTION SYSTEM

[76] Inventor: Ronald C. Nusbaum, 1110 Delaware Ave., Ste. E, Longmont, Colo. 80501

[21] Appl. No.: 913,403

[22] Filed: Sep. 30, 1986

Related U.S. Application Data

[63] Continuation-in-part of Ser. No. 715,377, Mar. 25, 1985, Pat. No. 4,619,749.

[51] Int. Cl.⁴ .......................... C25C 1/20; C25C 7/06; C25B 15/02
[52] U.S. Cl. .................................... 204/228; 204/231; 204/267; 204/269; 204/109
[58] Field of Search ............... 204/228, 267, 269, 109, 204/231

[56] References Cited

U.S. PATENT DOCUMENTS

| | | | |
|---|---|---|---|
| 4,068,677 | 1/1978 | Steur et al. | 204/228 X |
| 4,078,983 | 3/1978 | Higgins | 204/228 |
| 4,422,912 | 12/1983 | Stevens | 204/228 X |
| 4,612,102 | 9/1986 | Brimo et al. | 204/228 |

Primary Examiner—Donald R. Valentine
Attorney, Agent, or Firm—Fleit, Jacobson, Cohn & Price

[57] ABSTRACT

Reference voltages selectively calibrated to match electrolyte being processed, influence adjustment of current controllers through which plating voltages are applied to primary and secondary electrodes of a dual chamber tank assembly, the primary reference voltage being modified by feedback of sensed secondary plating current from the secondary cathode. The reference voltages are regulated and limited to enable transfer of information between cascaded tank assemblies.

19 Claims, 9 Drawing Figures

1

MULTIPLE CHAMBER SILVER EXTRACTION SYSTEM

BACKGROUND OF THE INVENTION

This invention relates generally to electrolytic recovery of silver from photographic fixer liquids, and embodies improvements over the apparatus and method disclosed in prior copending application Ser. No. 715,377, filed Mar. 25, 1985, now U.S. Pat. No. 4,619,749, with respect to which the present application is a continuation-in-part.

FIELD OF THE INVENTION

The apparatus disclosed in the prior copending application features a tank assembly divided into two compartments or chambers through which electrolytic liquid passes in sequence. At least two electrodes are suspended within each chamber and plating voltages are applied across each pair of electrodes under control of adjustable current controllers connected to an external source of voltage to vary the plating currents conducted through the electrolyte for optimum recovery of silver. Adjustment of the current controller connected to the primary anode in the first chamber receiving the electrolytic liquid, is effected automatically in response to changes in the plating current sensed through a conductor connected to the primary cathode which is maintained above a negative ground potential by a resistor connected in series therewith. The automatic control exercised by such sensing of the plating current is influenced by reference potentials. The levels of such reference potentials are selectively calibrated to match the particular electrolyte being processed.

The foregoing type of silver recovery apparatus under certain conditions exhibits problems either requiring circuit redesign or tolerance for less tan optimum performance. Such problems are caused by circuit resistance variations resulting from the sensing network, system cabling, electrodes and electrolytes. Also, the ability of the apparatus to process electolytic liquids having a wide variation of silver ion concentration was found to be inadequate because of liquid "burning" and electrode sulfiding.

It is therefore an important object of the present invention to provide an improved silver recovery apparatus within which the aforementioned circuit resistances are cancelled or compensated for.

Other objects are to provide apparatus capable of coping with wide variations in electrolyte flow rate and silver ion concentration in the electrolytes being processed, and to prevent liquid "burn" and minimize sulfiding of the electrodes.

SUMMARY OF THE INVENTION

In accordance with the present invention, both the primary and secondary sections of a dual chamber tank assembly of the type disclosed in the prior copending application, aforementioned, are automatically controlled to obtain optimum recovery of silver from the electrolytic liquid. The primary and secondary anodes are therefore separately connected to control circuits for comparison of the primary and secondary plating voltages with reference voltages selectively calibrated to match the electrolyte being processed. The control circuits adjustably drive the current controllers through which the plating voltages are applied to the anodes. The plating current in the secondary chamber is sensed by a feedback circuit connected to the secondary cathode to modify the primary reference voltage and thereby increase the primary plating voltage in response to excessive plating current in the secondary chamber. The secondary plating current is thereby caused to approach zero.

Furthermore, both the primary and secondary reference voltages are regulated by current limiting and compensating circuits in accordance with the corresponding primary and secondary plating currents within limits established by a maximum reference voltage circuit. An additional circuit for each section of the tank assembly provides overvoltage protection by influencing regulation of the reference voltages in accordance with the volt drop across the electrodes in each chamber.

The overvoltage protection circuits also ensure that feedback of information from the secondary section to the primary section through the feedback circuit aforementioned, is not inhibited. Further, the action of the overvoltage protection circuits makes possible communication between cascaded tank assemblies, resulting in the secondary chamber of the final tank assembly of a flow chain established by such cascading to exercise final commands through its feedback circuit so that only the plating current in the final secondary chamber may be made to approach zero. The control circuitry associated with each tank assembly is therefore provided with input means for transfer of information from the primary section of a preceding tank assembly of the cascade chain to the secondary section, with output means connected to the primary section to transmit information to the next in line tank assembly. Each individual tank assembly is therefore provided with a cascade communications capability.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF PREFERRED EMBODIMENTS

Figure 1:
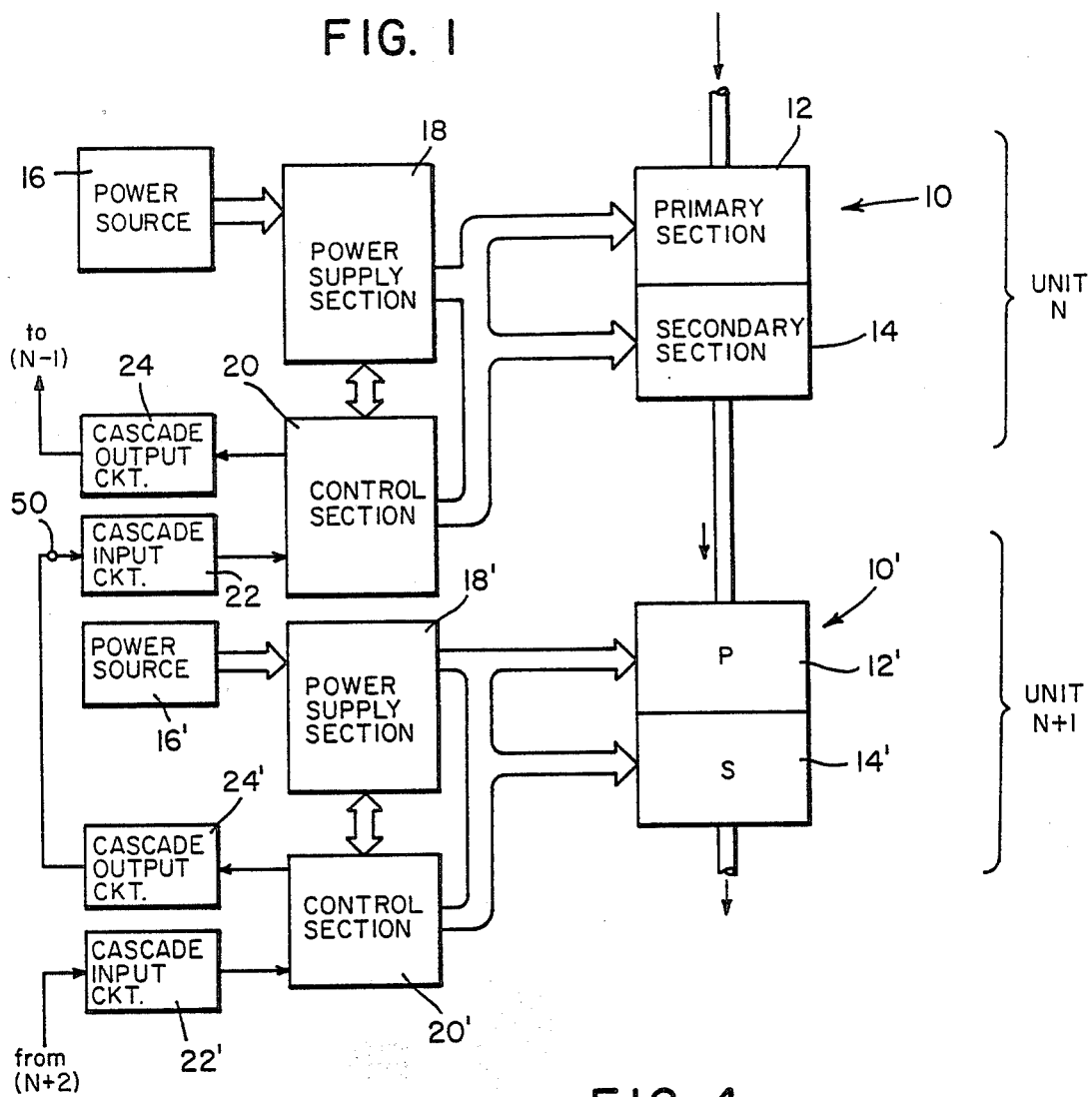
FIG. 1 is a schematic block diagram generally illustrating a cascaded, dual-chamber tank type of electrolytic silver recovery system in accordance with the present invention.

Referring now to the drawings in detail, FIG. 1 schematically shows an electrolytic silver recovery tank assembly 10 having separate chamber sections, which in the illustrated embodiment consists of a primary section 12 and a secondary section 14 through which electrolytic liquid passes in sequence. Power for operating the tank assembly 10 of one unit (N) for example, is derived from a power source 16 through a power supply section 18 with which a control section 20 is associated. A plurality of such tank assembly units may be interconnected in a flow chain and operationally cascaded so as to provide intercommunication between individual tank assemblies for comparative analysis of operating conditions to control generation of condition responsive commands and to monitor various operating parameters as will be described in detail hereinafter. Such cascading capability is achieved by use of input and output cascade circuits monitoring each tank assembly such as circuits 22 and 24 for unit (N). The input cascade circuit 22 is connected to the controls for the secondary section 14 of tank assembly 10 as shown while the output cascade circuit 24 supplies information to a preceding unit (N−1) (not shown) while the next in line unit (N+1) has its tank assembly 10' similarly monitored by input and output cascade circuits 22' and 24' through its control section 20'. A separate power supply 16' and power supply section 18' is also provided as shown to operate unit (N+1) in generally the same manner, with the output of circuit 24' being connected to the circuit 22 of unit (N).

The physical construction and arrangement of each tank assembly may be the same as that disclosed in greater detail in the prior copending application, Ser. No. 715,377, aforementioned, shown in a simplified fashion in FIG. 2 as tank assembly 10. Each section of the tank assembly is formed by a separate chamber or compartment within which at least two electrodes are immersed in the electrolytic liquid. Thus, the primary chamber is shown with an anode 26 and cathode 28 suspended therein, while anode 30 and cathode 32 are suspended within the secondary chamber. Plating voltage is applied to the primary and secondary anodes 26 and 30 through conductors 34 and 36 from the power supply section 18 connected to the power source 16 in the form of a power transformer having a primary winding 40 connected to 120 VAC electrical voltage source. Operating conditions are sensed by the control section 20 through conductors 34 and 36 respectively connected to the anodes 26 and 30 and through conductors 42 and 44 respectively connected to the cathodes 28 and 32 connected to ground by resistors 46 and 48. The input cascade circuit 22 is connected to the secondary section 14 through the control section 20 while the output cascade circuit 24 is connected to the primary current sensing conductor 42 to which the primary cathode 28 is connected in order to establish the cascade control train as described with respect to FIG. 1.

Figure 2:
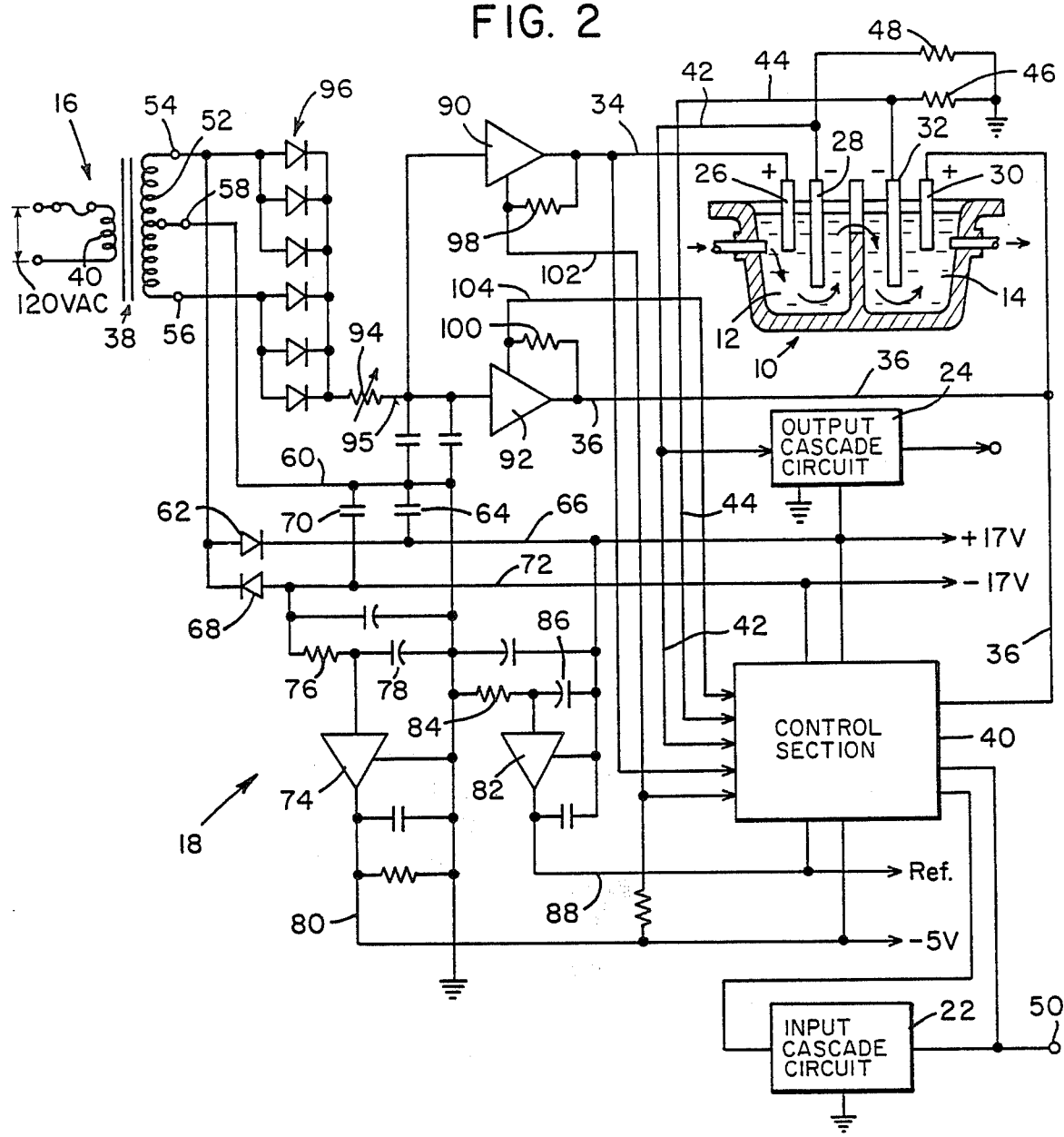
FIG. 2 is a partialy schematic diagram of a single dual chamber tank type of apparatus in accordance with the present invention, with the power supply circuit section shown in detail.

With continued reference to FIG. 2, the input power transformer 38 has a secondary winding 52 having opposite power terminals 54 and 56 and an intermediate terminal 58 connected to ground through a ground reference line 60. A diode 62 connected to winding power terminal 54 and capacitor 64 connected between the ground line and the output cathode side of diode 62 establish a +17 volt bias supply in line 66 for all control circuitry. A diode 68 also connected to the winding power terminal 54 in reverse relation to diode 62 and capacitor 70, form a −17 volt negative bias supply in line 72 for all control circuitry. A voltage regulating module 74 is connected to the negative voltage supply line 72 through resistor 76 at its junction with grounded capacitor 78 to provide −5 volt potential in line 80 to enable decrease toward zero of the primary and secondary voltages supplied to the electrodes through conductors 34 and 36. Another voltage regulating module 82 is connected to the junction between grounded resistor 84 and capacitor 86, coupled to voltage line 66, to provide a negative reference voltage with respect to line 66 in line 88.

The operating tank voltages for the anodes 26 and 30 of the tank assembly are applied through conductors 34 and 36 from the outputs of adjustable power regulating control amplifiers 90 and 92 connected to power supply line 95 to which rectifying diodes 96 connect the power terminals 54 and 56 of the transformer winding 52. Feedback resistors 98 and 100 interconnect the outputs of the amplifiers 90 and 92 with terminals to which drive voltages are applied through lines 102 and 104 from the control section 20 in order to vary the power fed to the tank assembly by modulating the outputs of amplifiers 90 and 92 with current through the grounded resistors 46 and 48 sensed at the cathodes 28 and 32 through lines 42 and 44. The power regulating amplifiers 90 and 92 absorb excessive power therein when reducing the plating voltages applied to the anodes.

Figure 3:
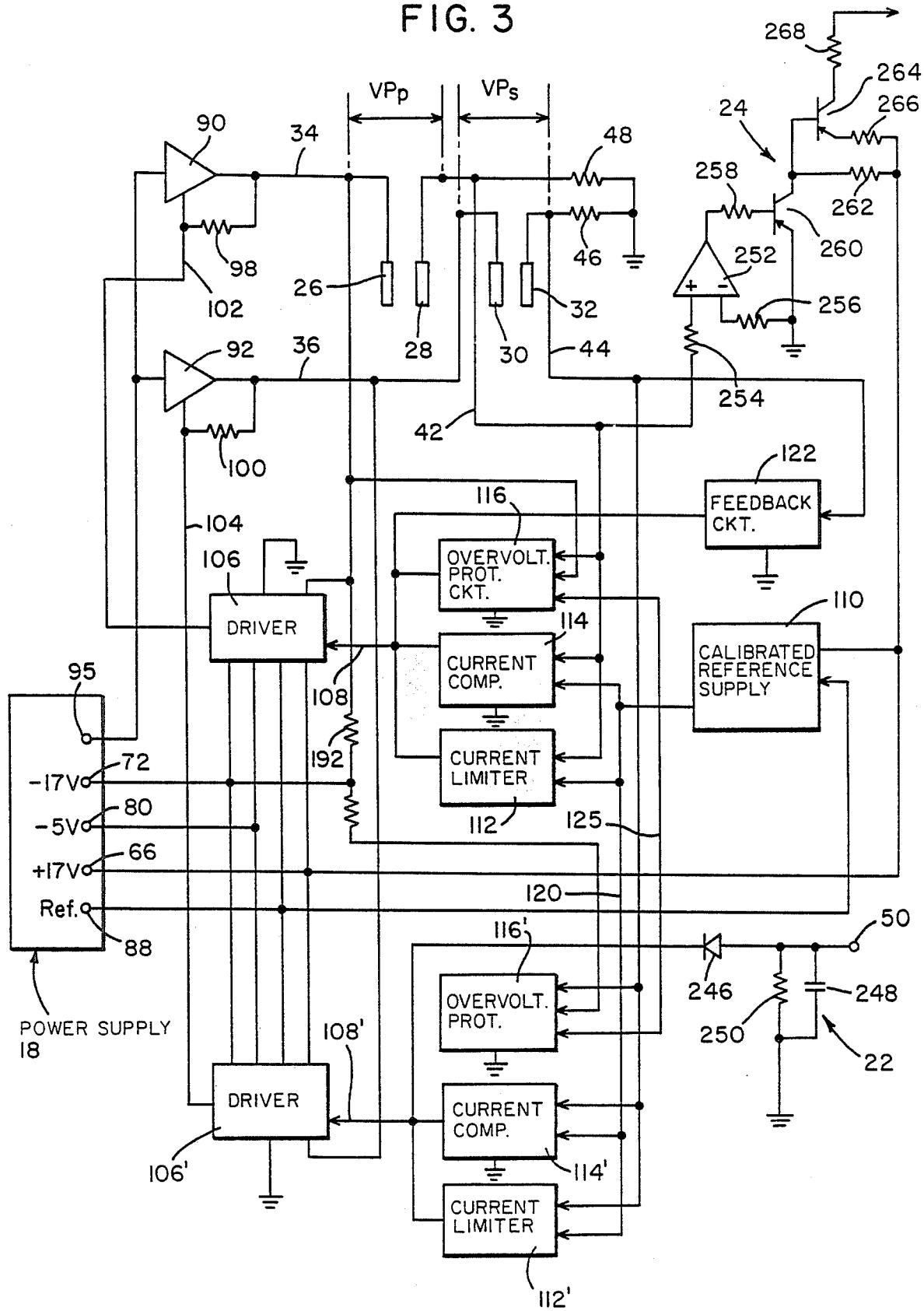
FIG. 3 is a block diagram of the control circuitry associated with the apparatus depicted in FIG. 2.

Referring now to FIG. 3, the control section 20 includes a driver circuit 106 having an output to which the drive control line 102 is connected. The output of circuit 106 will depend on the anode voltage applied thereto as an input from conductor 34 and a selectively controlled input applied through voltage bias line 108 from a current compensating circuit 114 to which cathode conductor 42 is connected and line 120 from a reference supply circuit 110. The plating voltage is limited by a current limiting circuit 112. An overvoltage protection circuit 116 is connected across the anode and cathode of the primary tank section through conductors 34 and 42. Operating limits for the overvoltage protection circuit 116 is established by its connection to the reference supply circuit 110 through line 125 to regulate the primary voltage bias in line 108.

The reference supply circuit 110 is also connected by line 125 to a second overvoltage protection circuit 116' associated with the secondary tank section through the conductors 36 and 44 to which the secondary electrodes 30 and 32 are connected. Corresponding current limiting and current compensating circuits 112' and 114' are also associated with the secondary section from which a secondary reference bias line 108' applies an input to a driver 106' to control the amplifier 92 as shown in FIG. 3. The secondary cathode conductor 44 is connected to the current limiting, compensating and overvoltage protection circuits 112', 114' and 116' and to the input terminal of a feedback circuit 122 having an output connected to the primary reference line 108. Except for the affect of the feedback circuit 122 thereon, the driver circuits 106 and 106' perform similar functions in controlling the electrode voltages supplied by amplifiers 90 and 92.

As indicated with respect to FIG. 3, the positive rectified voltage in line 66 from the power supply and the reference voltage in line 88 are applied to the calibrated reference voltage supply circuit 110 to produce reference control currents in lines 108 and 108' and a maximum reference limiting current in line 120. The circuit 110 is shown in detail in FIG. 4. The reference voltage in line 88 is applied to the non-inverting input of amplifier 124 having an inverting input coupled to a calibrating network 148 and by resistor 126 to the +17 V power supply line 66 to produce an output in line 125 that is a function of the reference voltage in line 88. Output line 125 is connected to the overvoltage protective circuits 116 and 116' and through resistors 128 and 130 applies an input to the bases of transistors 132 and 134. The output collectors of the transistors 132 and 134 are respectively connected to the primary and secondary reference lines 108 and 108'. Transistor 132 is connected between voltage line 66 and ground in series with resistor 136 and capacitor 138 to establish a primary reference current in line 108 dependent on a predetermined volt drop across the fixed resistor 136. Transistor 134 on the other hand, is connected in series with resistor 140 and capacitor 142. However, the volt drop across resistor 140 is dependent on fixed resistor 144 and the resistive calibrating network 148 having parallel connected branches formed by resistors 146 and selector switches 148$_1$, 148$_2$, '''148$_n$ connected between the inverting input of the amplifier 124 and the emitter of transistor 134 to which resistor 140 is connected. Through the selector switches the network 148 is calibrated to establish a stable and accurate reference volt drop across resistor 140 in accordance with the measured voltage drop across resistor 150 interconnecting the +17 V voltage supply line 66 and the reference voltage line 88. The desired primary and secondary voltages may thereby be selected by closing of appropriate switches of network 148 to insert a corresponding resistor 146, as shown by way of example in the following calibrating table based on the use of eight selector switches, so as to correspond with a digital readout of the measured volt drop across resistor 150 and use of a 182k ohm resistor 144, with both primary and secondary voltages being the same.

CALIBRATION TABLE

| Selector Switch No. Resistor (ohms) | 1<br>22 M | 2<br>12 M | 3<br>6.2 M | 4<br>3.0 M | 5<br>1.5 M | 6<br>768 K | 7<br>383 K | 8<br>191 K | Tank Voltages |
|---|---|---|---|---|---|---|---|---|---|
| | 0 | 0 | 0 | 0 | 0 | 1 | 1 | 0 | 0.692 |
| | 0 | 0 | 0 | 0 | 1 | 0 | 0 | 1 | 684 |
| | 0 | 0 | 0 | 0 | 1 | 1 | 0 | 0 | 677 |
| | 0 | 0 | 0 | 0 | 1 | 1 | 1 | 1 | 669 |
| | 0 | 0 | 0 | 1 | 0 | 0 | 1 | 0 | 662 |
| | 0 | 0 | 0 | 1 | 0 | 1 | 0 | 1 | 655 |
| | 0 | 0 | 0 | 1 | 1 | 0 | 0 | 0 | 649 |
| | 0 | 0 | 0 | 1 | 1 | 0 | 1 | 1 | 642 |
| | 0 | 0 | 0 | 1 | 1 | 1 | 1 | 0 | 636 |
| | 0 | 0 | 1 | 0 | 0 | 1 | 0 | 0 | 626 |
| | 0 | 0 | 1 | 0 | 0 | 1 | 1 | 1 | 621 |
| | 0 | 0 | 1 | 0 | 1 | 0 | 1 | 0 | 615 |
| | 0 | 0 | 1 | 0 | 1 | 1 | 0 | 1 | 0.610 |
| | 0 | 0 | 1 | 1 | 0 | 0 | 0 | 0 | 0.605 |
| | 0 | 0 | 1 | 1 | 0 | 1 | 1 | 0 | 0.596 |
| | 0 | 0 | 1 | 1 | 1 | 1 | 0 | 0 | 0.587 |
| | 0 | 1 | 0 | 0 | 0 | 0 | 1 | 0 | 0.579 |
| | 0 | 1 | 0 | 0 | 1 | 0 | 0 | 0 | 0.572 |
| | 0 | 1 | 0 | 0 | 1 | 1 | 1 | 0 | 0.564 |
| | 0 | 1 | 0 | 1 | 0 | 1 | 0 | 0 | 0.557 |
| | 0 | 1 | 0 | 1 | 1 | 0 | 1 | 0 | 0.551 |
| | 0 | 1 | 1 | 0 | 0 | 0 | 0 | 0 | 0.545 |
| | 0 | 1 | 1 | 0 | 0 | 1 | 1 | 0 | 0.539 |
| | 0 | 1 | 1 | 0 | 1 | 1 | 0 | 0 | 0.534 |
| | 0 | 1 | 1 | 1 | 0 | 0 | 1 | 0 | 0.528 |
| | 0 | 1 | 1 | 1 | 1 | 0 | 0 | 0 | 0.523 |
| | 1 | 0 | 0 | 0 | 0 | 0 | 0 | 1 | 0.516 |
| | 1 | 0 | 0 | 0 | 1 | 0 | 1 | 0 | 0.509 |
| | 1 | 0 | 0 | 1 | 0 | 0 | 1 | 1 | 0.503 |

Figure 4:
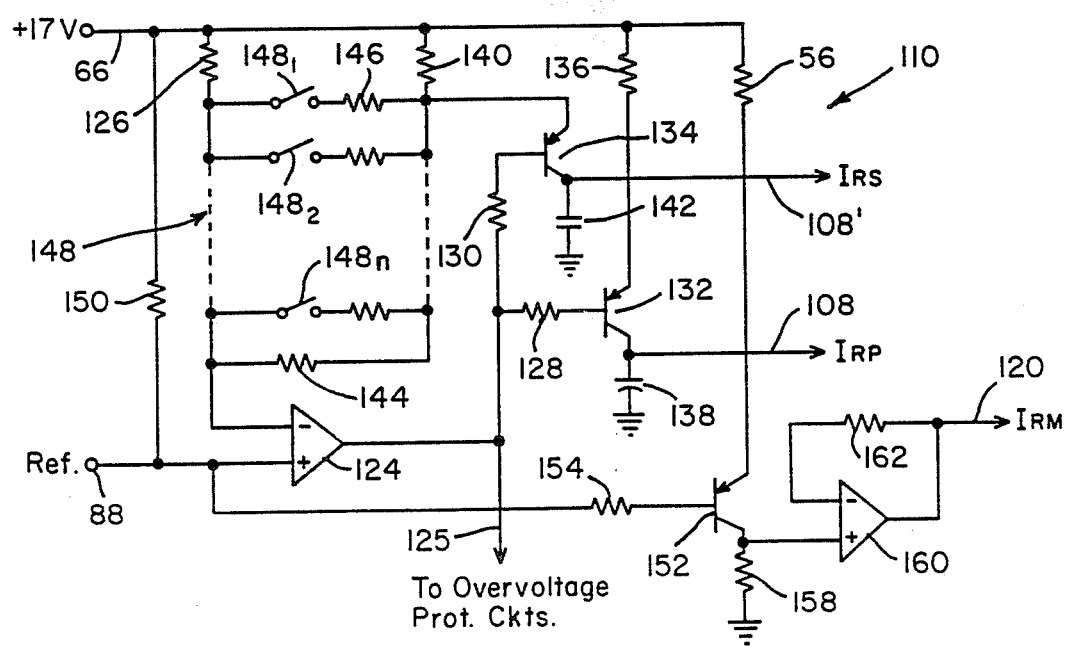
FIG. 4 is a detailed electrical circuit diagram of the calibrated reference supply and maximum reference voltage circuits depicted by block diagram in FIG. 3.

It will be apparent from the foregoing table that the power supply voltage applied to the tank electrodes through conductors 34 and 36 may be varied as desired by control of the reference currents in lines 108 and •' to effect a corresponding change in the rate at which silver is extracted from its electrolyte. Such electrode currents and voltages are limited to a maximum allowable value by the circuits 116, 116', 112 and 112' as aforementioned with respect to FIG. 3. As shown in FIG. 4, the circuit 110 includes a transistor 152 having its input base coupled by resistor 154 to the reference voltage source in line 88 from the power supply. Current is conducted by transistor 152 in series with resistors 156 and 158 between the +17 V supply line 66 and ground to apply an input from its collector to the non-inverting input terminal of an operational amplifier 160 having a feedback resistor 162 connected to its inverting terminal. The output voltage of amplifier 160 in line 120 will therefore determine the maximum allowable tank currents as a predetermined function of the reference voltage in line 88.

The primary and secondary drive circuits 106 and 106' respectively supply low drive currents through lines 102 and 104 to the adjust terminals of the power regulating amplifiers 90 and 92. Both drive circuits 106 and 106' are the same in arrangement and operation, so that only drive circuit 106 is shown in detail in FIG. 5. The output of the drive circuit 106 is coupled by resistor 164 and line 102 to the adjust terminal of the power regulating amplifier and acts with its feedback resistor 98 to damp stray inductance caused by cabling. Resistor 164 is connected to the emitter of a buffer stage transistor 166 having its collector connected by a current limiting resistor 168 to the +17 V voltage supply line 66. Bias is applied from the −5 V bias voltage line 80 through resistor 170 to the emitter of transistor 166 and to the inverting input terminal of operational amplifier 172 having its output terminal coupled to the base of transistor 166 through resistor 174 to prevent parasitic oscillations. The non-inverting input terminal of amplifier 172 is connected to resistor 176 and grounded capacitor 178 to limit maximum band width transmission through the amplifier from the output of an error amplifier 180. Negative feedback to the inverting input terminal of amplifier 180 is provided for through series connected capacitor 182 and resistor 184 to determine signal gain with respect to the anode voltage fed thereto by line 34 through resistor 186. Capacitor 188 is connected in parallel with resistor 186 to the inverting input terminal of amplifier 180 to which grounded resistor 190 is also connected to provide a stabilizing network connected to a source of negative bias from the −17 V voltage line through loading resistor 192. Resistor 192 ensures minimum loading of amplifier 90 for stability under no load conditions. The non-inverting input terminal of amplifier 180 is connected through resistor 194 to the primary reference line 108 for control of the current drive output of circuit 106.

Figure 5:
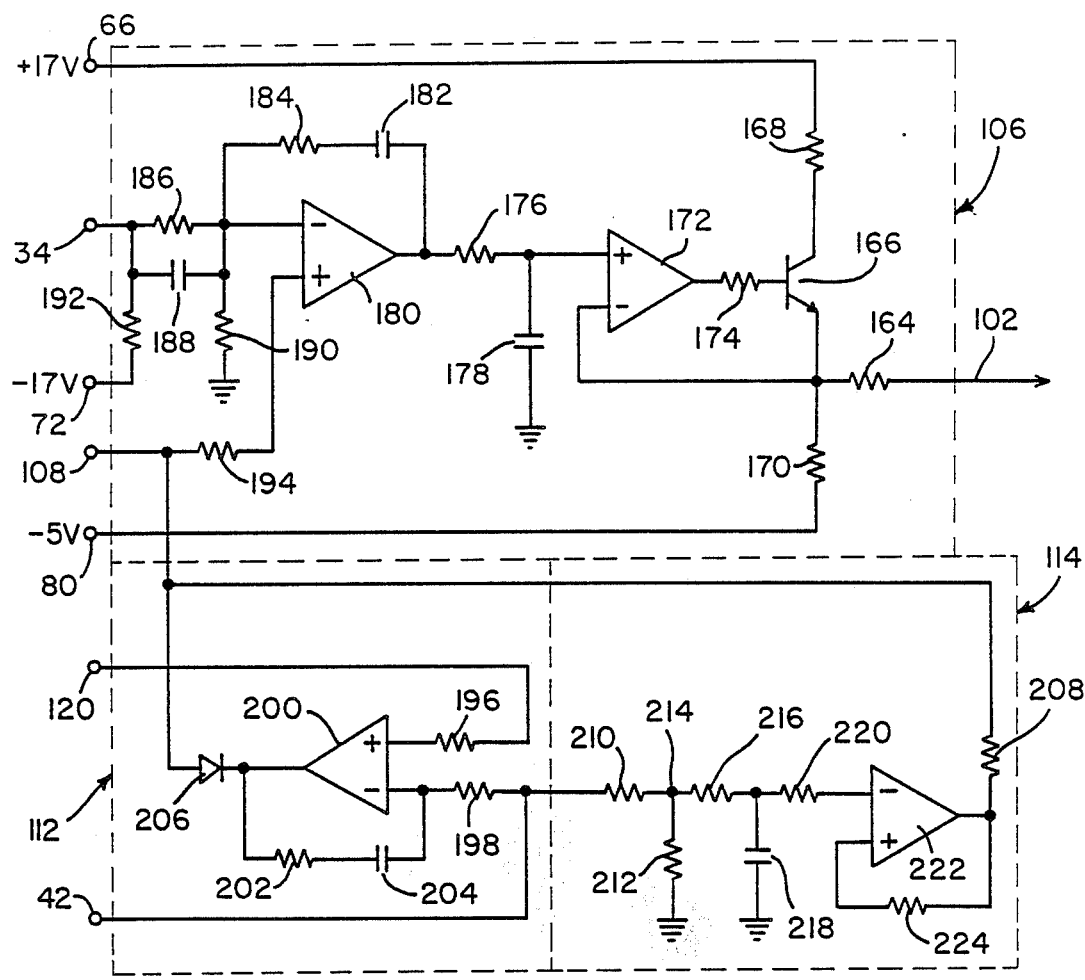
FIG. 5 is a detailed electrical circuit diagram of the driver, current limiting and current compensating circuits shown in FIG. 3.

The current in line 108 is modulated by the current limiting circuit 112, as shown in detail in FIG. 5, in accordance with the maximum reference voltage in line 120 and the cathode voltage in line 42, respectively connected by resistors 196 and 198 to the input terminals of an operational amplifier 200. Negative feedback between the inverting input terminal and the output terminal of amplifier 200 is established through resistor 202 and capacitor 204. The output terminal of amplifier 200 is isolated from the voltage potential of line 108 to which it is coupled by diode 206. Any time the current limits are exceeded, the diode 206 will be forwardly biased to control the voltage potential of line 108 to which the output of the current compensating circuit 114 is connected through resistor 208.

Current compensating circuit 114 is connected to the cathode voltage line 42 through voltage dividing resistor 210 connected to a grounded voltage dividing resistor 212 at junction 214 at which the amount of compensation is determined. The divided cathode voltage is fed by a low pass filter, formed by resistor 216 and grounded capacitor 218, and resistor 220 to the non-inverting input terminal of operational amplifier 222. A feedback resistor 224 which interconnects the output and inverting input terminals of the amplifier 222, acts as a buffer to modulate the reference voltage in line 108 through resistor 208. The current compensating action of circuit 114 ensures that system resistance has minimal effect on the actual voltage responsible for the electrolytic action.

Figure 6:
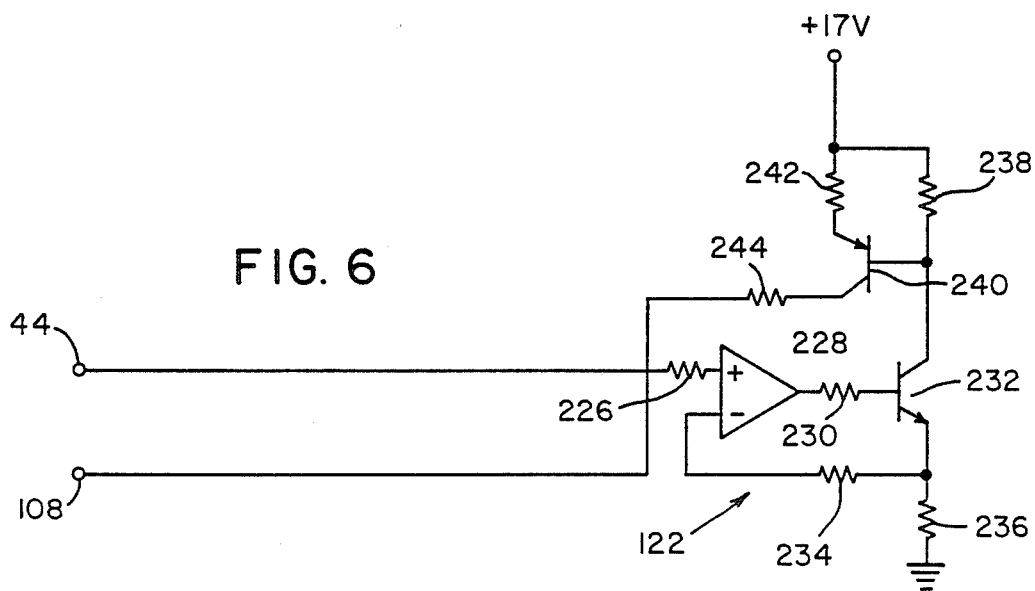
FIG. 6 is a partial block diagram and a detailed electrical circuit diagram of the feedback circuit shown in FIG. 3.

The drive, current limiting and current compensating circuits 106′, 112′ and 114′ for the secondary section 14 of the tank assembly are the same as circuits 106, 112 and 114 for the primary section 12 and cooperate in the same manner with respect to the anode voltage line 36, reference line 108′ and cathode current sensing line 44 as shown in FIGS. 3 and 6 to supply current drive through line 104 to the power regulating amplifier 92 from which the anode voltage line 36 extends to the secondary section 14 of the tank assembly. Feedback information from the secondary section 14 is fed to the primary section 12 through the feedback circuit 122, shown in detail in FIG. 6, to increase the bias reference voltage in line 108 if the silver concentration level is too high. The secondary cathode line 44 is connected through current limiting resistor 226 to the non-inverting input terminal of operational amplifier 228 in the feedback circuit to supply the secondary information input thereto. The output of amplifier 228 is fed through resistor 230 to the base of transistor 232 controlling feedback through resistor 234 to the inverting input terminal of amplifier 228 from its emitter maintained above ground level by resistor 236. A load resistor 238 connects the +17 V voltage line 66 to the collector of transistor 232 and the base of transistor 240. Assuming a large gain through transistor 240, the volt drop across resistor 238 determines the volt drop across resistor 242 and the current fed through line 208.

Reference bias in line 108′ for the secondary section of a tank assembly unit (N) may be increased by a status input from an immediately following tank assembly unit (N+1) of a cascade train through terminal 50 to the input cascade circuit 22, shown in detail in FIG. 3. Such silver status input is applied through diode 246 to line 108′ and is filtered by capacitor 248 and resistor 250 connected in parallel between diode 246 and ground. Information of silver recovery status from the primary section 12 to the preceding unit (N−1) is fed from the primary cathode line 42 through the output cascade circuit 24, also shown in detail in FIG. 3. The circuit includes an operational amplifier 252 having an inverting input terminal connected by resistor 254 to cathode line 42 and a non-inverting terminal maintained above ground through resistor 256. The output of amplifier 252 is fed through resistor 258 to the base of a transistor 260 having a grounded emitter and an output collector connected to the +17 V supply line 66 through load resistor 262. The output collector is connected to the base of a buffer transistor 264 connected in series with resistors 266 and 264 between the voltage line 66 and the input cascade circuit of the preceding tank assembly unit (N−1) of the cascade train.

As hereinbefore, indicated, current from the secondary tank section 14 conducted by cathode line 44 to the feedback circuit 122 affects the power supply to the primary tank section 12 by an output from the feedback circuit 122 being applied to line 108 to increase primary bias voltage as a function of secondary tank current. Ideally, the secondary tank current should approach zero corresponding to a condition in which no silver is passing out of the system. However, if the electrolytic flow rate is too high, additional bias for the primary tank is provided to reduce silver concentration in the secondary tank. Such action occurs automatically by means of the feedback circuit 22 when the current in the secondary tank exceeds a critical level determined by resistors 242 and 238 and transistor 240 as described with respect to FIG. 6. When primary tank bias reaches a critical level as a result of the foregoing action, the overvoltage protection circuits 116 and 116′ act to prevent burning of the electrolyte. Also, communication between cascaded tank assemblies will be limited by the overvoltage protection circuits as will be explained hereinafter.

Figure 7:
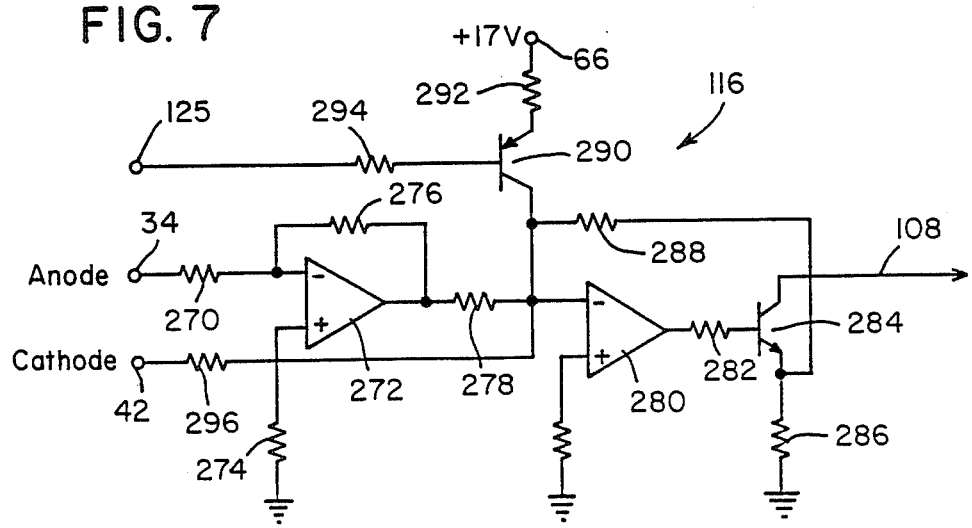
FIG. 7 is a detailed electrical circuit diagram of the overvoltage protection circuit shown in FIG. 3.

FIG. 7 illustrates in detail one of the overvoltage protection circuits 116 shown in FIG. 3. The anode voltage in line 34 is applied as an input through resistor 270 to the inverting input terminal of operational amplifier 272 having its non-inverting terminal connected to grounded resistor 274 and a feedback resistor 276 connected between the inverting and output terminals. The output of amplifier 272 is applied through resistor 278 to the inverting terminal of a summing amplifier 28 to which the cathode line 42 is also connected through resistor 296. The output current from amplifier 280 will accordingly be the summation of currents conducted through resistors 278, 296 and 288 and through a transistor 290, having its input base connected by resistor 294 to the calibrated reference line 125 and its emitter connected by resistor 292 to the +17 V voltage line 66. In response to excessive anode voltage in line 34, the volt drop across resistor 288 reaches a "crosstalk" inhibiting value and a switch-on signal is developed by amplifier 280, applied through resistor 282 to the base of transistor 284. Switch on of transistor 284 conducts current through resistor 288 to regulate the bias voltage applied to line 108 and feedback of current through resistor 288 to the inverting input terminal of amplifier 280.

The overvoltage limiting action of circuit 116 as hereinbefore described, is varied in accordance with the setting of the reference supply circuit 110 as previously described with respect to FIG. 4, by transistor 290 having its output collector also connected to the non-inverting input terminal of the amplifier 280. Control current is conducted by transistor 290 from the +17 V voltage supply line 66 through resistor 292 in accordance with the reference voltage applied to its base through resistor 294 from the output of amplifier 124 in circuit 110 through line 125.

The overvoltage protection circuit 116' for the secondary tank section is the same in arrangement and operation as circuit 116 in limiting and regulating the secondary bias voltage in line 108' as shown in FIG. 3.

The operational theory and circuit design parameters underlying the system hereinbefore described was developed on the basis that each tank section may be represented by an equivalent circuit in which the electrolyte forms an effective resistance (Re) dependent on the tank electrodes independent of the silver concentration. The internal battery effect of the electrolyte and electrodes aforementioned, represented as a potential (Vb) applied to the electrolytic resistance (Re) was assumed to vary in inverse relation to the silver concentration (Q) in the electrolyte pursuant to the Nerst boundary effect equation, $$Vb = \frac{Vo - K \log Q}{Re}.$$

In accordance with the present invention, the power supply is connected across the internal battery potential (Vb) and the electrolytic resistance (Re), and is represented as an external battery power potential (Vp) interconnected in series between an equivalent power supply resistance (Rp) and a negative feedback or compensating resistance (Rc). The plating current (I) conducted through such an equivalent circuit would therefore follow the equation:

$$I = \frac{(Vp - Vb)}{(Re + Rp + Rc)}$$

The denominator of the foregoing equation (Re+Rp+Rc) should approach zero for maximum sensitivity to changes in silver concentration and must always be above zero to ensure stable operation. The external power potential (Vp) is to be determined empirically because the electrolytic process involved does not exactly follow the Nerst equation. The compensating resistance (Rc) was set close to the electrolytic resistance (Re) because it was found that the two parameters involved change somewhat with time.

In order to optimize silver recovery, each tank assembly is provided with at least two section chambers through which the electrolytic liquid passes in sequence during recovery of silver by electrolytic plating on the electrodes in each chamber. The plating currents are varied by the power controlling devices 90 and 92 for the dual chamber tank assembly 10 described, under control of bias control voltages applied to the adjusting terminals through lines 106 and 104. Under optimum conditions, the plating current through the chamber of secondary section 14 is made to approach zero by feedback through circuit 122 to increase the bias voltage controlling the voltage supply to the chamber of the primary section 12 through controller 90, below a limit established by the overvoltage protection circuit 116 to avoid inhibiting of "crosstalk". In view of the cascading capability, the system may be designed to recover silver in an optimum fashion with respect to a wide variation of electrolyte liquid flow rates and silver concentrations. Burning of the electrolyte in any tank of a cascaded train, as a result of excess silver in an immediately following tank, will be prevented because "cross talk" will be reduced by the overvoltage protection circuits as the plating action causes internal battery voltage to increase.

Figure 8:
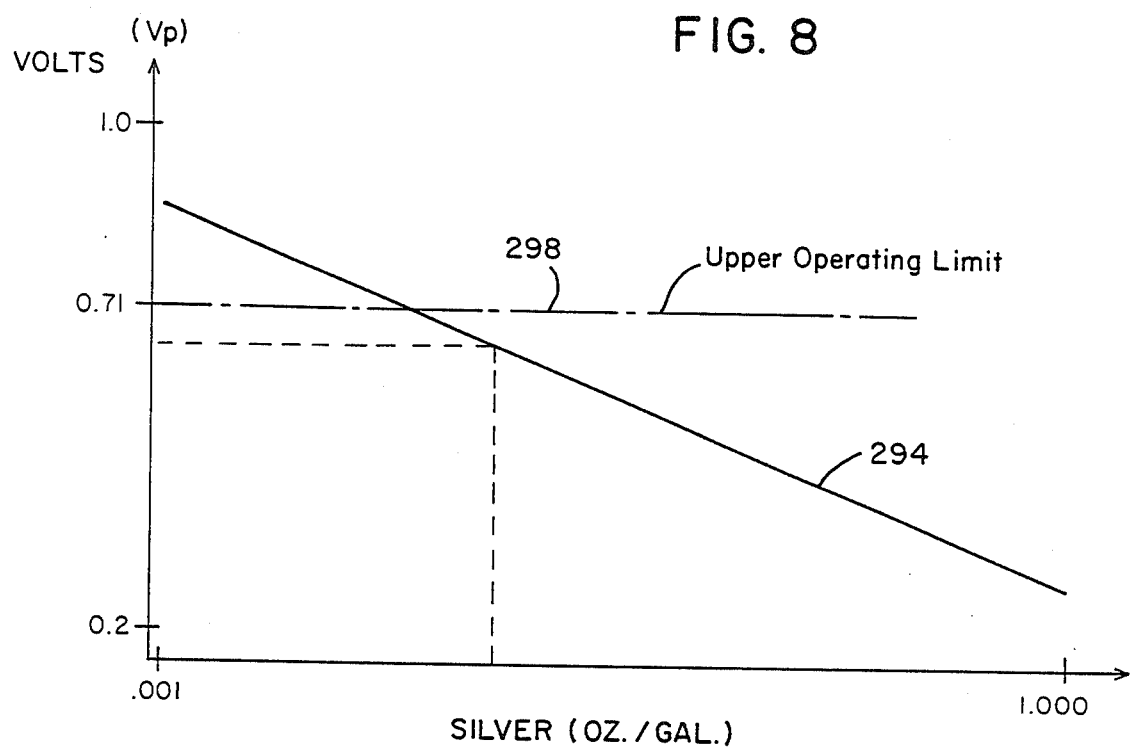
FIGS. 8 and 9 are graphical illustrations of estimated and measured operating characteristics of the apparatus shown in FIGS. 2-7.
Figure 9:
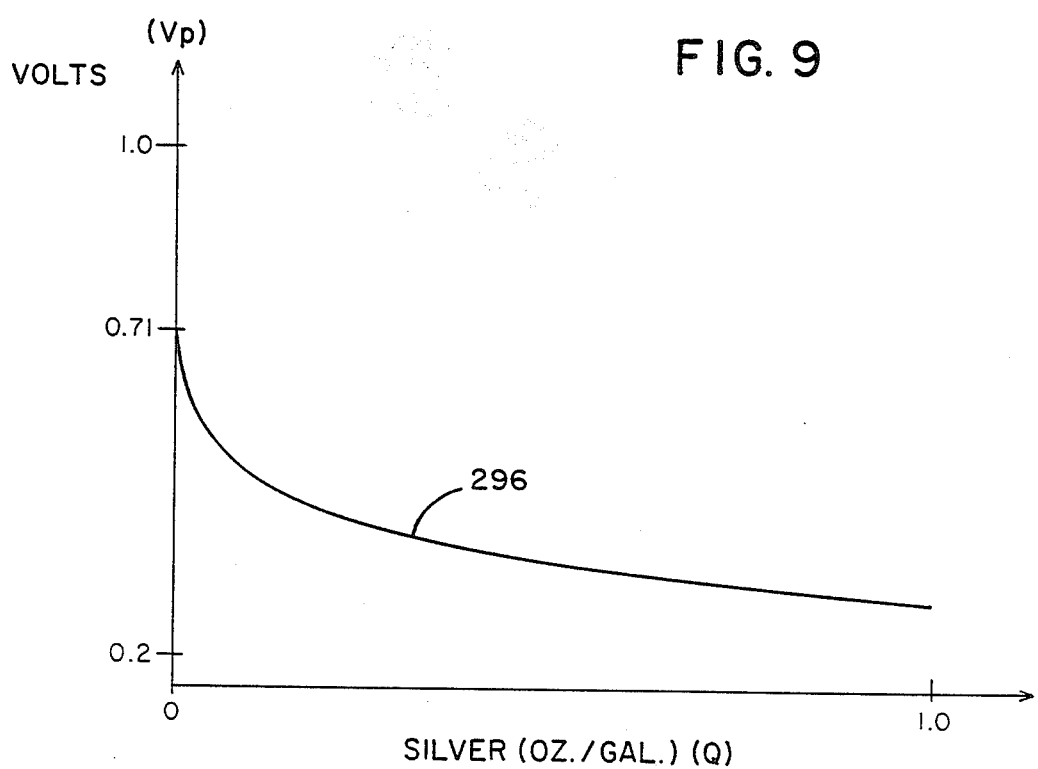

The system hereinbefore described may be tailored to any particular electrolyte in the field by varying the power supply voltage (Vp) as aforementioned in connection with the Calibration Table. According to one example, the concentration of silver (Q) in the electrolyte passed out of the system is measured. From such measurements the internal battery potential (Vb) may be estimated by use of the Nerst equations hereinbefore set forth and plotted against the silver concentration (Q) as shown by curve 294 in FIG. 8. By measuring the plating current (I) and power supply voltage (Vp) for any given silver concentration (Q), the actual internal battery potential (Vb) may also be plotted as indicated by curve 296 in FIG. 9. From curve 296, an upper operating limit for the silver concentration is established as denoted by limit line 298 in FIG. 8, below which supply voltage changes may be estimated from curve 294 in order to obtain any desired silver concentration level for the electrolyte being passed out of the system.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In combination with apparatus for recovering metal from a body of electrolytic liquid conducting plating current therethrough between at least two electrodes, including adjustable current control means connected to one of the two electrodes for changing said plating current supplied thereto from a voltage source, resistive means connected in series with the other of the two electrodes for establishing an electrode potential on the other of the electrodes dependent on resistance characteristics of the liquid, and reference voltage selection means connected to said source for selectively generating a reference potential, the improvement comprising control means connected to said one of the two electrodes and the reference voltage selection means for adjusting the current control means in accordance with the reference potential and means connected to both of the electrodes for regulating the reference potential to correctively change the plating current.

2. The combination of claim 1 including a tank within which said body of liquid is enclosed, means dividing said tank into primary and secondary compartments, means for conducting flow of the liquid from the primary compartment into the secondary compartment, said two electrodes being enclosed within the primary compartment, a pair of secondary electrodes enclosed within the secondary compartment, secondary current control means and resistive means respectively connected to the secondary electrodes, and secondary control means connected to said reference voltage selection means and one of said secondary electrodes for adjusting the secondary current control means.

3. In combination with apparatus for recovering metal from a body of electrolytic liquid conducting plating current therethrough between at least two electrodes, including voltage adjusting means connected to one of the two electrodes for changing said plating current supplied thereto from a voltage source, resistor means connected in series with the electrodes for establishing a potential on the other of the electrodes dependent on resistance characteristics of the liquid and reference voltage selection means connected to said source for producing a reference potential, the improvement residing in power control means, comprising regulating means connected to both of said electrodes and the reference voltage selection means for regulating the reference potential, and driver means connected to one of the electrodes and the voltage adjusting means for varying the plating current in accordance with the regulated reference potential.

4. The improvement as defined in claim 3 including secondary electrodes and secondary power control means connecting the secondary electrodes in parallel with the first mentioned electrodes to said voltage source and feedback means connected to the secondary electrodes for modifying the regulated reference potential in accordance with the current conducted between said secondary electrodes.

5. In combination with apparatus for recovering metal from a body of electrolytic liquid conducting plating currents therethrough between a primary cathode and anode and between a secondary cathode and anode, a container enclosing the liquid having a partition separating two compartments within which the primary and secondary cathodes and anodes are suspended, respectively, resistor means connected in series with the cathodes for establishing potentials thereon dependent on resistance characteristics of the liquid, reference voltage selection means for producing primary and secondary reference potentials, means respectively connected to the primary and secondary cathodes and the reference voltage selection means for regulating said reference potentials, power adjusting means respectively connected to the regulating means for controlling the plating currents in accordance with the regulated reference potentials and feedback means connected to the secondary cathode for modifying the regulated primary reference potential.

6. An electrolytic device having an anode, a cathode and an electrolyte to be processed, including a power source, controller means coupling the power source to the anode for applying a plating voltage across the anode and the cathode and calibrating means connected to the power source for establishing a reference potential selected to correspond with the electrolyte to be processed, the improvement comprising means connected to the cathode and the calibrating means for regulating the reference potential, and driver means connected to the regulating means and the controller means for adjusting the plating voltage in accordance with the regulated reference potential.

7. In combination with a plurality of the electrolytic devices as defined in claim 6, cascading means interconnecting said devices for transferring information between the devices to interrelate control of the plating currents therein and means connected to each of the devices for limiting said regulation of the reference potentials below levels inhibiting said transfer of information.

8. The combination of claim 7 wherein each of the devices includes a secondary anode and a secondary cathode, separate controller means connected to the secondary anode, secondary regulating means connected to the secondary cathode and the calibrating means, and secondary driver means interconnecting the secondary controller means and the secondary regulating means, and feedback means interconnecting the secondary cathode with the first mentioned regulating means for modifying the regulated reference potential applied to the first mentioned controller means, whereby the plating current between the secondary anode and cathode of a final one of the devices approaches zero.

9. The combination of claim 6 wherein said electrolytic device further includes a secondary anode and a secondary cathode, separate controller means connected to the secondary anode, secondary regulating means connected to the secondary cathode and the calibrating means, and secondary driver means interconnecting the secondary controller means and the secondary regulating means, and feedback means interconnecting the secondary cathode with the first mentioned regulating means for modifying the regulated reference potential applied to the first mentioned controller means, whereby the plating current between the secondary anode and the secondary cathode approaches zero.

10. In combination with a multi-chamber type of electrolytic metal recovery apparatus having a plurality of chambers through which an electrolyte passes in sequence and a pair of electrodes respectively positioned within each chamber, a source of voltage, current control means connected to said source for applying plating voltages across each pair of the electrodes, selectively calibrated means connected to said source for generating reference potentials corresponding to the electrolyte in the chambers, driver means connected to the electrodes and the selectively calibrated means for adjusting the plating voltages through the current control means in accordance with the reference potentials and feedback means responsive to current conducted through the electrolyte between the electrodes in one of the chambers for modifying the reference potential adjusting the plating voltage in another of the chambers until the current in said one of the chambers approaches zero.

11. The combination of claim 10 wherein the apparatus includes a plurality of tank assemblies and tank cascading means operatively interconnecting the tank assemblies for establishing said one of the chambers as a final chamber through which the electrolyte passes in sequence.

12. The combination of claim 11 including means responsive to current conducted between the electrodes in each of the chambers for regulating all of the reference potentials and means for limiting said regulation of the reference potentials.

13. The combination of claim 10 including means responsive to current conducted between the electrodes in each of the chambers for regulating all of the reference potentials generated and means limiting said regulation of the reference potentials for preventing application of excessive plating voltages across the electrodes.

14. The combination of claim 10 wherein the electrolyte forms an effective resistance ($R_e$) between the electrodes and establishes an internal battery effect potential ($V_b$) across the effective resistance as an inverse function of metal concentration in the electrolyte, said source of voltage applying an external battery potential ($V_b$) across the internal battery potential of the electrolyte in series with an equivalent resistance ($R_p$) of the voltage source and a negative compensating resistance ($R_c$) of the feedback means so that current (I) conducted through the electrolyte in said other of the chambers substantially follows the expression $$\frac{(V_p - V_b)}{(R_e + R_p + R_c)},$$

wherein ($R_c$) is approximately the same as ($R_e$) and ($R_e + R_p + R_c$) approaches zero.

15. The combination of claim 14 wherein said one of the chambers is a final chamber through which the electrolyte passes downstream of said other of the chambers.

16. The combination of claim 10 wherein said one of the chambers is a final chamber through which the electrolyte passes downstream of said other of the chambers.

17. In a silver recovery system including at least one chamber holding an electrolyte containing silver to be recovered, an anode, a cathode onto which the silver is plated, and means for supplying the electrolyte to the chamber; power applying means having an input terminal, a first output terminal connected to the anode, a control terminal through which different plating power levels are set and a second output terminal; means for sensing current drawn from the power applying means, having an input terminal connected to the second output terminal of the power applying means and an output terminal; current generator means for generating a current of predetermined amplitude, having an output terminal; and comparator means for comparing the amplitudes of the sensed current with said current generated by the current generator means, having a first input terminal connected to the output terminal of the current sensing means, a second input terminal connected to the output terminal of the current generator means and an output terminal connected to the control terminal of the power applying means; whereby, when the sensed current exceeds said predetermined amplitude the power applying means is set to one of the different plating levels and when said sensed current is less than said predetermined amplitude the power applying means is set to another of the different plating levels.

18. The combination of claim 17 wherein said power applying means includes a grounded resistor connected to the cathode through said second output terminal of the power applying means.

19. The combination of claim 18 including calibrating means connected to the current generator means for selecting said predetermined amplitude.

* * * * *